United States Patent
Baran et al.

(10) Patent No.: US 10,938,820 B2
(45) Date of Patent: Mar. 2, 2021

(54) DATA TRANSFER PREVENTION

(71) Applicant: International Business Machines Corporation, Armonk, NY (US)

(72) Inventors: Evren O. Baran, Ulster, NY (US); Gary A. Fisher, Poughkeepsie, NY (US); Kieron D. Hinds, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 16/004,754

(22) Filed: Jun. 11, 2018

(65) Prior Publication Data

US 2019/0379668 A1 Dec. 12, 2019

(51) Int. Cl.
*H04L 29/06* (2006.01)

(52) U.S. Cl.
CPC .......... *H04L 63/101* (2013.01); *H04L 63/166* (2013.01)

(58) Field of Classification Search
CPC .............................. H04L 63/101; H04L 63/166
See application file for complete search history.

(56) References Cited

U.S. PATENT DOCUMENTS

| | | | |
|---|---|---|---|
| 7,191,219 B2* | 3/2007 | Udell | G06F 21/10 709/201 |
| 7,860,793 B2 | 12/2010 | Karkanias et al. | |
| 8,081,633 B2 | 12/2011 | Veits | |
| 9,035,774 B2 | 5/2015 | Scott et al. | |
| 9,111,103 B2 | 8/2015 | Sadovsky et al. | |
| 9,792,451 B2* | 10/2017 | Smith | G06F 21/606 |
| 10,387,674 B2* | 8/2019 | Myman | G06F 21/6245 |
| 2002/0199021 A1 | 12/2002 | Beier | |
| 2005/0060561 A1* | 3/2005 | Pearson | G06F 21/57 713/194 |
| 2006/0112418 A1* | 5/2006 | Bantz | G06F 21/88 726/4 |
| 2008/0112300 A1* | 5/2008 | Kumhyr | G11B 27/034 369/83 |

(Continued)

FOREIGN PATENT DOCUMENTS

CN 102571949 7/2012

OTHER PUBLICATIONS

R. Zunino, "Defending the Bank with a Static Analysis," Proc. of NordSec. 2006, 12 pages.

*Primary Examiner* — William S Powers
(74) *Attorney, Agent, or Firm* — Cantor Colburn LLP; Teddi Maranzano

(57) ABSTRACT

A system includes a network adapter operable to interface with one or more computer networks. The system also includes a processing system operably coupled to the network adapter and configured to perform a plurality of operations. The operations include monitoring for a request to transfer data from a file including a self-destruction indicator, determining a targeted destination of the data based on detecting the request to transfer the data from the file including the self-destruction indicator, and determining whether the targeted destination is within an allowed network list associated with the file. The system prevents the transfer of data from the file to the targeted destination through the network adapter based on determining that the allowed network list excludes the targeted destination.

20 Claims, 6 Drawing Sheets

(56) References Cited

U.S. PATENT DOCUMENTS

| | | |
|---|---|---|
| 2011/0167470 A1 | 7/2011 | Walker et al. |
| 2012/0240185 A1* | 9/2012 | Kapoor ............... H04L 63/1425 726/1 |
| 2018/0330120 A1* | 11/2018 | Ray ........................ G06F 30/00 |

* cited by examiner

DATA TRANSFER PREVENTION

BACKGROUND

The present invention relates to computer networks, and more particularly, to data transfer prevention outside of allowed networks.

Computer systems can implement multiple types of security features to limit access to sensitive information. The use of passwords for access control and/or file encryption can effectively constrain access capabilities for unauthorized users. User identifiers with user-specific or group-specific permission controls can also be used to limit access to computer systems, file systems, and/or specific files. Once a user gains access to a restricted-access computer system, file system, or file, the user may be unconstrained with regard to transferring data to another user or system that would not otherwise have permission to access the data.

SUMMARY

According to a non-limiting embodiment, a system includes a network adapter operable to interface with one or more computer networks. The system also includes a processing system operably coupled to the network adapter and configured to perform a plurality of operations. The operations include monitoring for a request to transfer data from a file including a self-destruction indicator, determining a targeted destination of the data based on detecting the request to transfer the data from the file including the self-destruction indicator, and determining whether the targeted destination is within an allowed network list associated with the file. The system prevents the transfer of data from the file to the targeted destination through the network adapter based on determining that the allowed network list excludes the targeted destination.

According to another non-limiting embodiment, a method of data transfer prevention includes monitoring, by a processing system, for a request to transfer data from a file including a self-destruction indicator. The processing system determines a targeted destination of the data based on detecting the request to transfer the data from the file including the self-destruction indicator. The processing system also determines whether the targeted destination is within an allowed network list associated with the file. The transfer of data from the file to the targeted destination through a network adapter is prevented based on determining that the allowed network list excludes the targeted destination.

According to still another non-limiting embodiment, a computer program product includes a computer readable storage medium having program instructions embodied therewith. The program instructions are executable by a processing system to perform operations including monitoring for a request to transfer data from a file including a self-destruction indicator, determining a targeted destination of the data based on detecting the request to transfer the data from the file including the self-destruction indicator, and determining whether the targeted destination is within an allowed network list associated with the file. The program instructions are executable by the processing system to further perform preventing the transfer of data from the file to the targeted destination through a network adapter based on determining that the allowed network list excludes the targeted destination.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
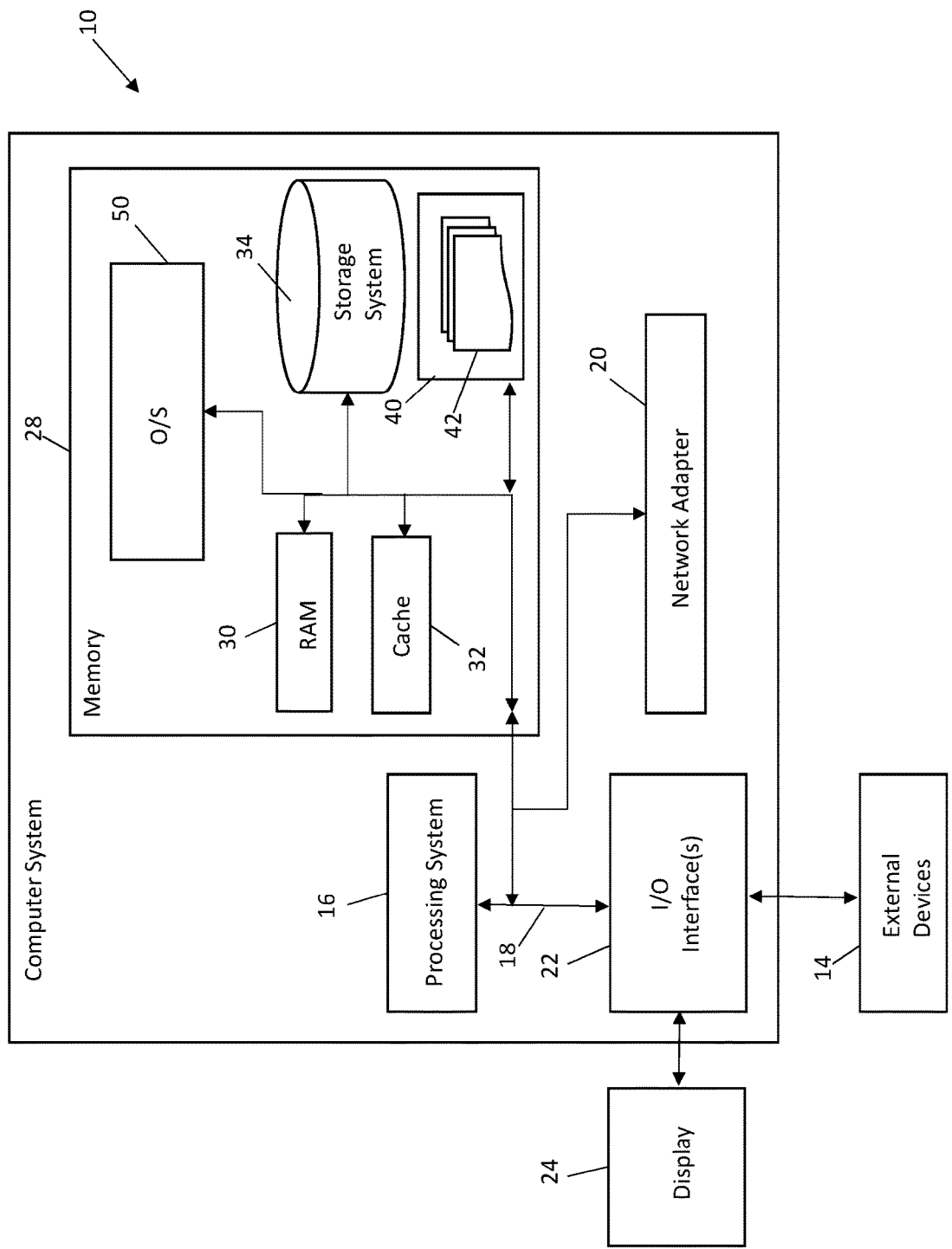
FIG. 1 is a block diagram illustrating a computer system in accordance with various embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, computer systems often support access controls to limit access to file systems or specific files. User or group-based credentials can limit read and write access to selected data items. However, once access is obtained, there is little control over subsequent actions, such as transmission of data from an access controlled system to a computer system external to the access controls on a different network. While individual passwords on files can provide a level of protection, an individual intentionally sending a password protected file to a computer system on another network may also provide the password as part of the transmission.

Turning now to an overview of the aspects of the invention, one or more embodiments of the invention address the above-described shortcomings of the prior art by providing data transfer prevention through controls incorporated in networking devices and/or a communication protocol stack. Data transfer prevention can use data tagging with a transfer prevention indicator, which may also be referred to as a self-destruction indicator. The self-destruction indicator can be a bit or other type of tag that associates data in a file with an allowed network list where the data is allowed to be sent. Transfer prevention can include dropping or deleting copies of the data during an attempted transmission to a network that is not included in the allowed network list. Self-destruction of data can include dropping/destroying data during transmission (e.g., in-flight).

The above-described aspects of the invention address the shortcomings of the prior art by preventing transmission of data from a file to a targeted destination based on determining that an allowed network list excludes (either explicitly by naming or implicitly by not including) the targeted destination as part of a requested transfer of the data from a file including a self-destruction indicator. The file including the data may also be deleted upon an attempted transfer to a targeted destination that is not on the allowed network list to prevent subsequent transmission attempts. Further, a user interface can be provided to tag files and/or groups of files with self-destruction indicators and select at least one computer network for the allowed network list associated with each file or group of files. Technical effects and benefits can include reducing network bandwidth demands by preventing file transfer outside of an allowed network list and enhancing security by preventing file transfers to unapproved networks/domains.

With reference now to FIG. 1, a computer system 10 is illustrated in accordance with a non-limiting embodiment of the present disclosure. The computer system 10 may be based on the z/Architecture, for example, offered by International Business Machines Corporation (IBM). The architecture, however, is only one example of the computer system 10 and is not intended to suggest any limitation as to the scope of use or functionality of embodiments described herein. Regardless, computer system 10 is capable of being implemented and/or performing any of the functionality set forth hereinabove.

Computer system 10 is operational with numerous other computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Further, elements of the computer system 10 can be incorporated in one or more network devices to support computer network functionality, such as a network switch, a network router, or other such network support devices.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a computing device, also referred to as a processing device. The components of computer system may include, but are not limited to, a processing system 16 including one or more processors or processing units, a system memory 28, and a bus 18 that couples various system components including system memory 28 to processing system 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that are accessible by computer system/server 10, and they include both volatile and non-volatile media, removable and non-removable media.

System memory 28 can include an operating system (OS) 50, along with computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

The OS 50 controls the execution of other computer programs and provides scheduling, input-output control, file and data management, memory management, and communication control and related services. The OS 50 can also include communication protocol support as one or more drivers to implement various protocol layers in a protocol stack (e.g., transmission control protocol/internet protocol (TCP/IP)) to support communication with other computer systems across one or more computer networks.

The storage system 34 can store a basic input output system (BIOS). The BIOS is a set of essential routines that initialize and test hardware at startup, start execution of the OS 50, and support the transfer of data among the hardware devices. When the computer system 10 is in operation, the processing system 16 is configured to execute instructions stored within the storage system 34, to communicate data to and from the memory 28, and to generally control operations of the computer system 10 pursuant to the instructions.

Program/utility 40, having a set (at least one) of program modules 42, may be stored in memory 28 by way of example, and not limitation, as well as the OS 50, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein at an application layer level in a communication protocol stack.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, data archival storage systems, etc.

Figure 2:
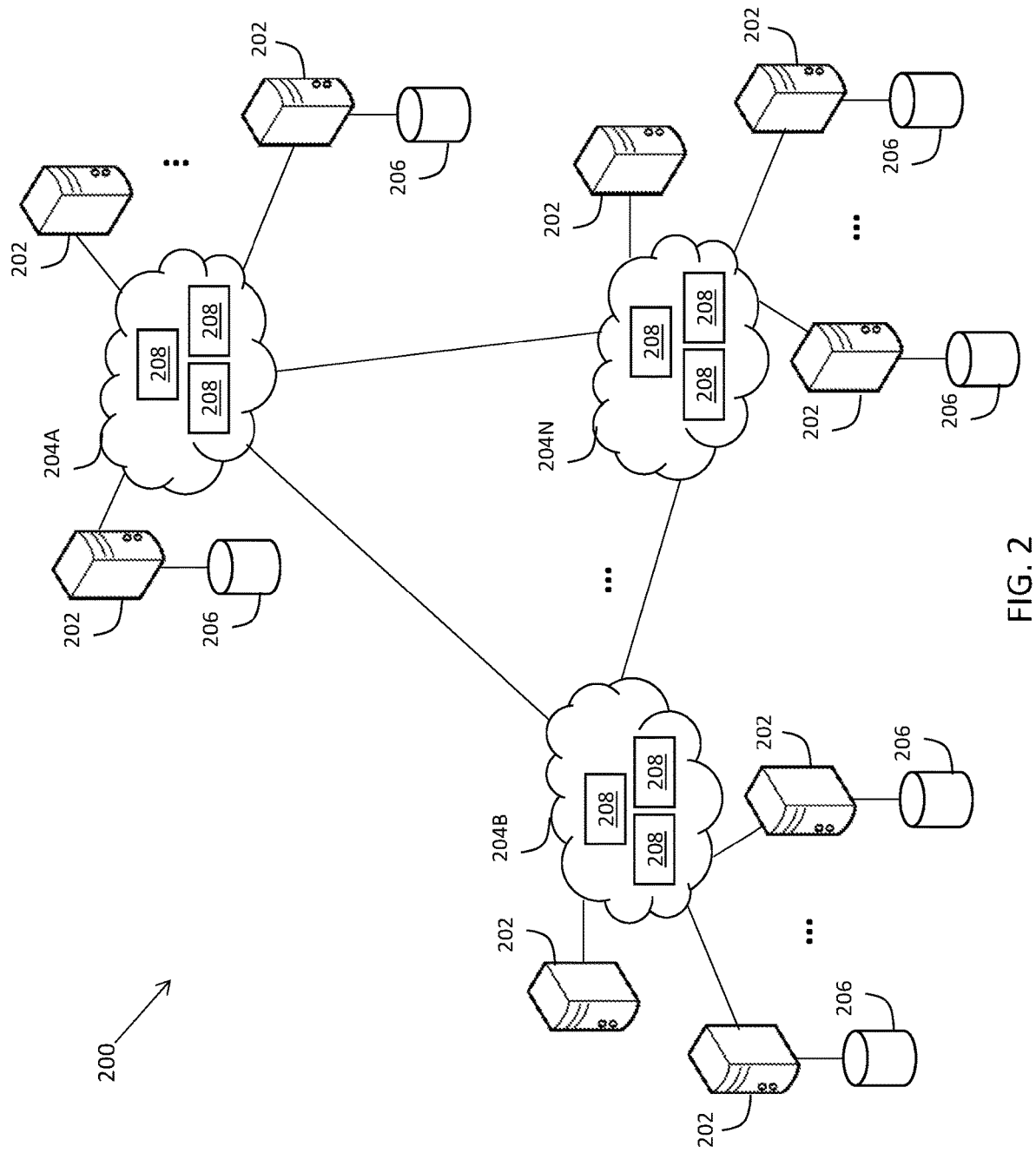
FIG. 2 is a block diagram of a networked computer system according to a non-limiting embodiment.

Turning now to a more detailed description of aspects of the present invention, FIG. 2 depicts a block diagram of a networked computer system 200. The networked computer system 200 can include a plurality of computer systems 202, which are embodiments of the computer system 10 of FIG. 1. The computer systems 202 can be distributed across multiple computer networks 204A, 204B, . . . , 204N that may be in different geographic locations and/or have different levels of security/authorization requirements. One or more of the computer systems 202 can include a storage system 206, such as storage system 34 of FIG. 1, configured to store one or more files comprising data. A plurality of network devices 208 can control the movement of data locally between the computer systems 202 within and between the computer networks 204A-204N. The network devices 208 can be any combination of network switches, network routers, and/or other network support devices known in the art. In embodiments, data transfer prevention between the computer networks 204A-204N can be managed by either or both of the computer systems 202 and the network devices 208. For example, the computer systems 202 and the network devices 208 can each include a processing system and a network adapter, such as processing system 16 and network adapter 20 of FIG. 1, to control the movement of data between the computer systems 202. Data transfer prevention can be implemented within the networked computer system 200 as further described herein with respect to FIGS. 3-6.

Figure 3:
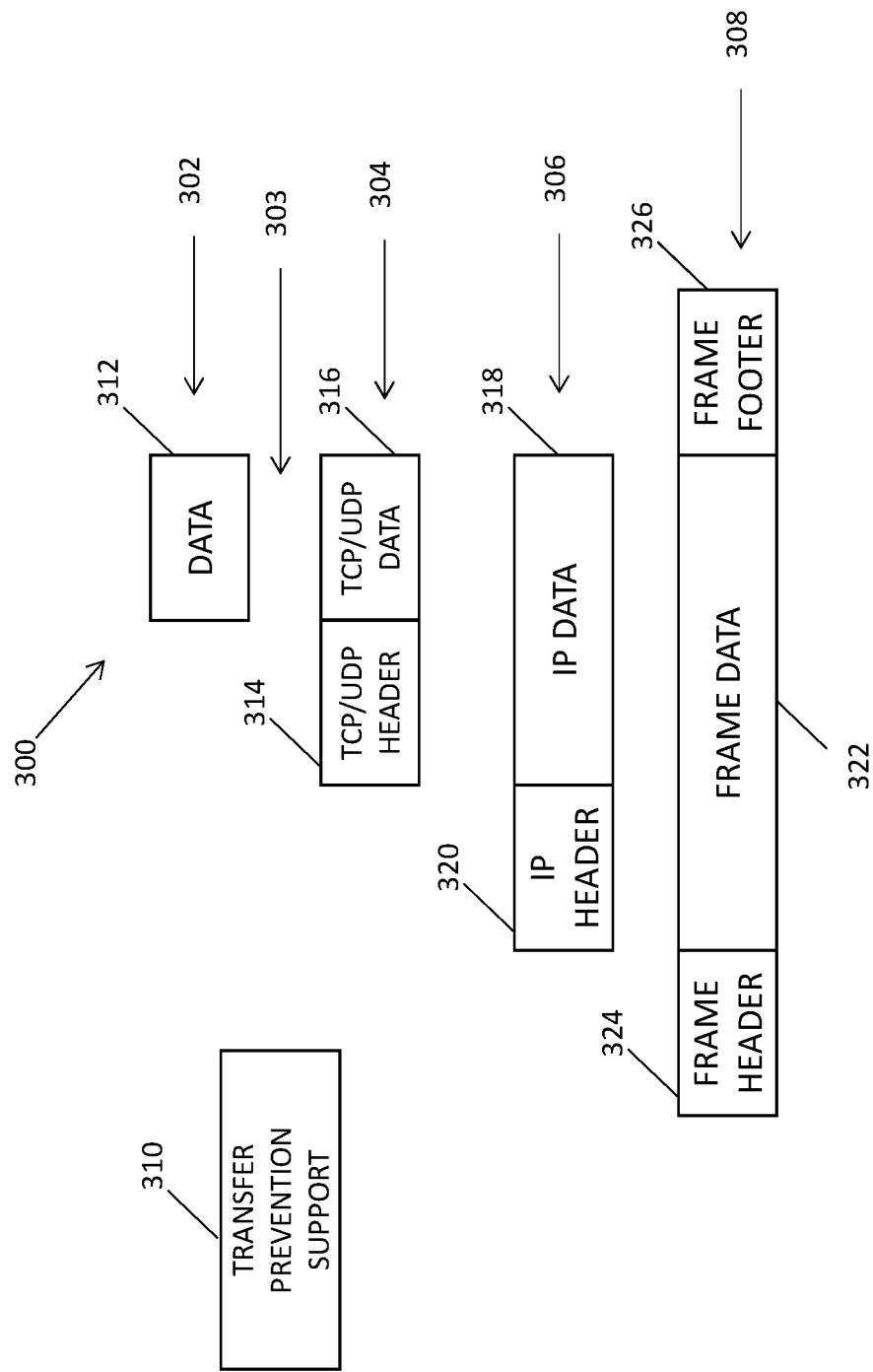
FIG. 3 is a block diagram illustrating a communication protocol stack in which transfer prevention support can be implemented according to a non-limiting embodiment.

FIG. 3 depicts a communication protocol stack 300 in which transfer prevention support 310 can be implemented according to embodiments. The communication protocol stack 300 in the example of FIG. 3 includes an application layer 302, a transport layer 304, an IP layer 306, and a link layer 308. It will be understood that other layer configurations, such as additional layers (not depicted), are contemplated. The application layer 302 can be directly accessible to applications, such as program modules 42 of FIG. 1. To transfer a file, the file may be split into multiple blocks or units of data 312 at the application layer 302. The data 312 may be encapsulated according to a transport layer protocol, such as TCP or user datagram protocol (UDP), where a TCP/UDP header 314 is appended to TCP/UDP data 316. The TCP/UDP header 314 and TCP/UDP data 316 can be encapsulated as IP data 318 with an IP header 320 at the IP layer 306. The IP header 320 and the IP data 318 can be encapsulated in frame data 322 with a frame header 324 and a frame footer 326 at link layer 308. The transport layer 304 and the IP layer 306 can be managed by drivers of the OS 50 of FIG. 1, and the link layer 308 can be managed by control circuitry of the network adapter 20 of FIG. 1. Transfer prevention support 310 can be implemented, for example, within the application layer 302, within the transport layer 304, as an intermediate protocol layer 303 between the application and transport layers 302 and 304, and/or in other/multiple layers 302-308.

Figure 4:
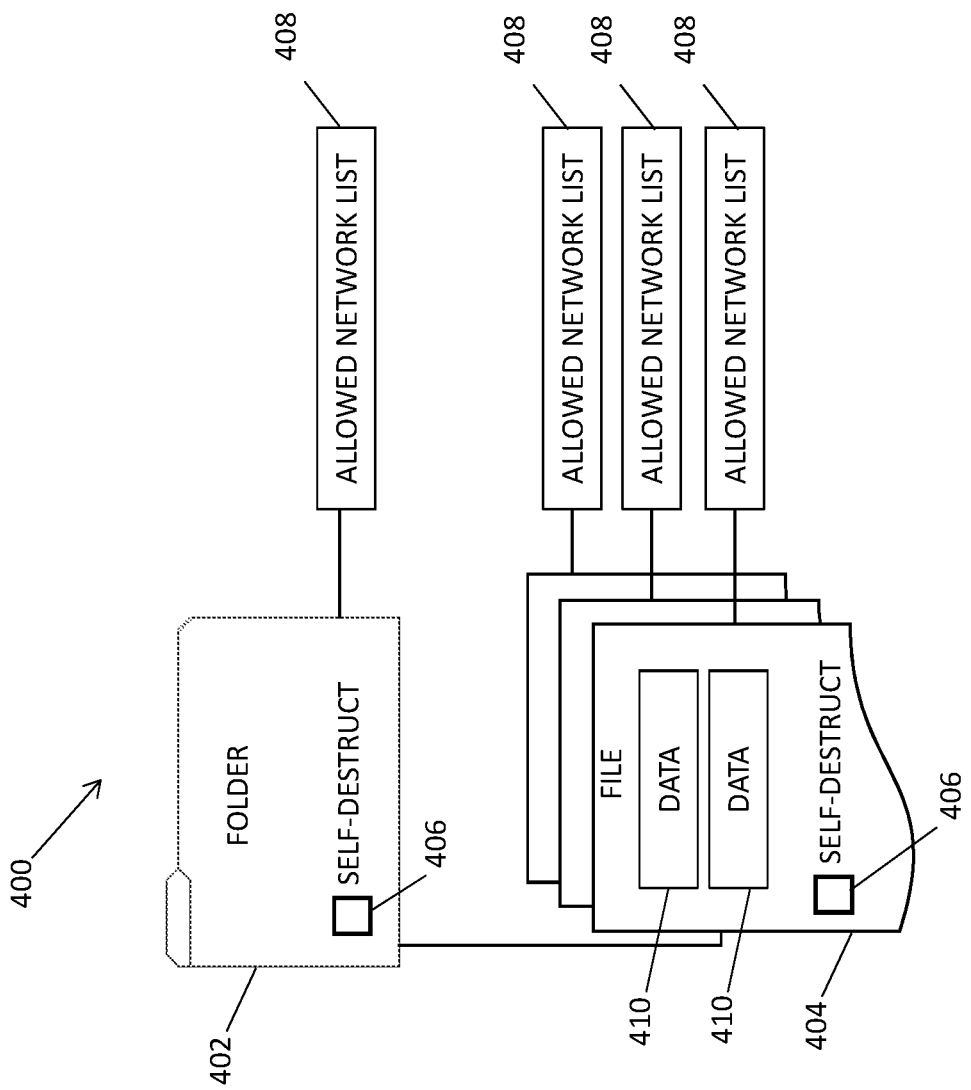
FIG. 4 is a block diagram illustrating a file system for transfer prevention support with according to a non-limiting embodiment.

FIG. 4 is a block diagram illustrating a file system 400 for transfer prevention support 310 of FIG. 3 with according to a non-limiting embodiment. In the example of FIG. 4, one or more folders 402 and/or files 404 of the file system 400 can include a self-destruction indicator 406 and an allowed network list 408 associated with the folders 402 and/or files 404. Each of the files 404 can include various amounts of data, which may be split into one or more data units 410. The data units 410 can be portions of the files 404, for instance, where the size of each of the files 404 is greater than a maximum transmission size of the data 312 in the communication protocol stack 300 of FIG. 3. The files 404 can be any type of files, such as text files, documents, spreadsheets, presentations, images, audio, video, and the like. The self-destruction indicator 406 may be set for a folder 402 for a plurality of files 404 or for a single file 404, for instance, as a bit or tag that can be checked or sent with the data units 410. Each allowed network list 408 can be customized by an administrator to establish the computer networks 204A-204N in which the folders 402 or files 404 are allowed to exist, for example, using IP addresses, domain names, subnet addresses, and/or other formats. Values of the self-destruction indicator 406 and allowed network list 408 can be set and/or checked by transfer prevention support 310 of FIG. 3 within computer systems 202 and/or network devices 208.

Figure 5:
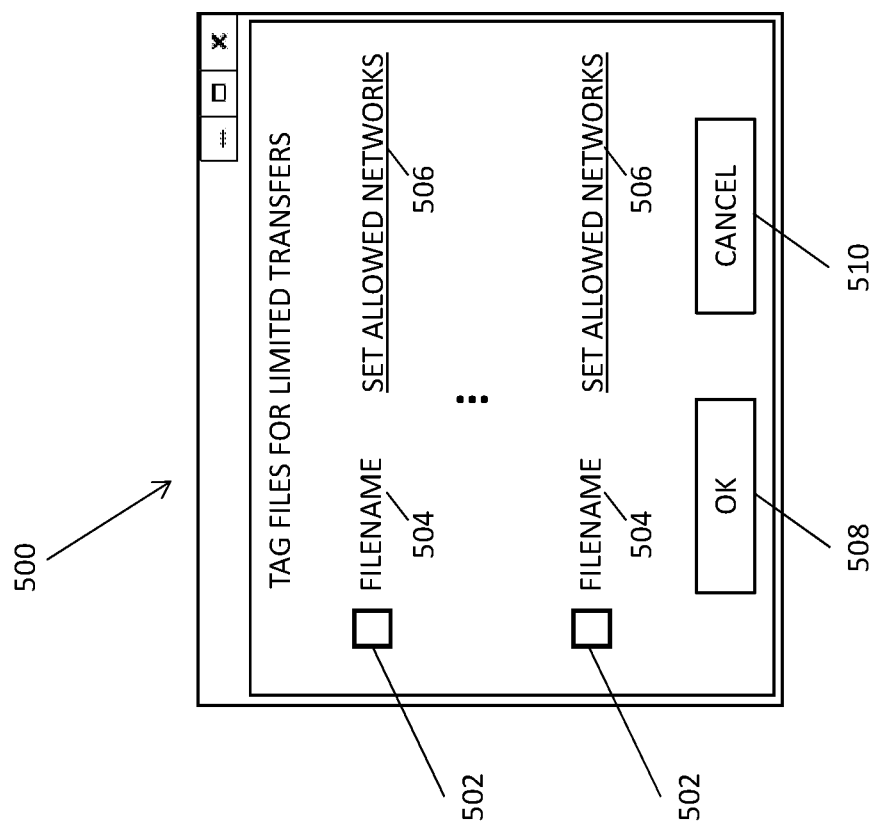
FIG. 5 illustrates a user interface to tag files for transfer prevention support according to a non-limiting embodiment.

FIG. 5 illustrates a user interface 500 to tag files/folders for transfer prevention support 310 of FIG. 3 according to a non-limiting embodiment. A file system application, a file transfer tool, or other such application (e.g., program modules 42 of FIG. 1) can provide an interactive interface to view and/or set values for the file system 400 of FIG. 4. In the example of FIG. 5, a checkbox 502 or similar interface can be used to set the self-destruction indicator 406 of FIG. 4 as a tag associated with a filename 504 of a file 404 of FIG. 4 (or folder 402 of FIG. 4). The user interface 500 can also provide a command or selectable link 506 to set values for the allowed network list 408 of FIG. 4 associated with the filename 504. The allowed network list 408 can be in any format, such as a selectable list, a user editable list, a location based list, a list of predefined groups of computer networks 204A-204N, and/or other formats. The user interface 500 can include various command buttons 508, 510, for instance, to indicate that updates are complete or to cancel any modifications for transfer prevention.

Figure 6:
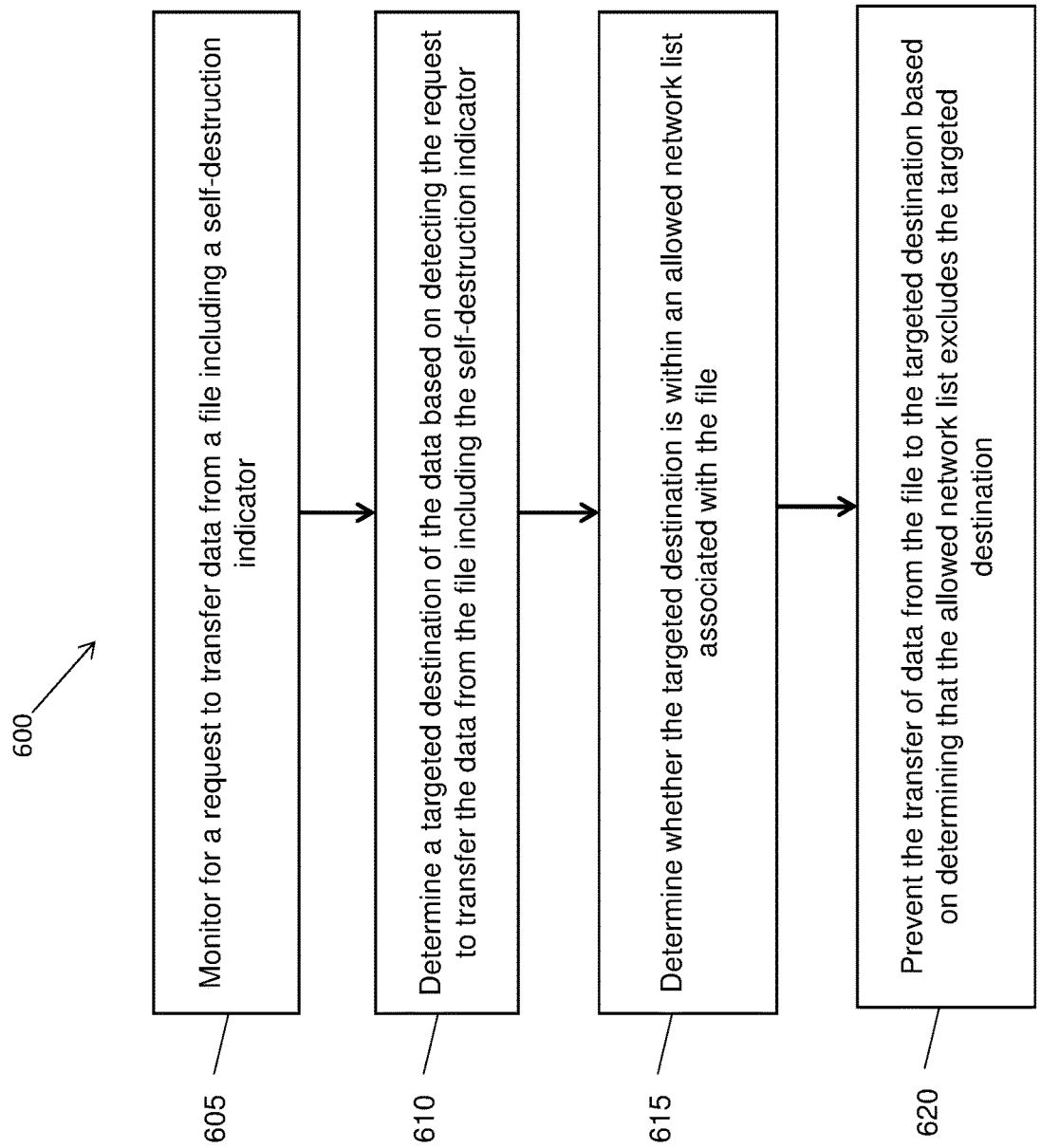
FIG. 6 is a flow diagram illustrating a method according to a non-limiting embodiment.

Turning now to FIG. 6, a flow diagram of a process 600 for data transfer prevention is generally shown in accordance with an embodiment. The process 600 is described with reference to FIGS. 1-6 and may include additional steps beyond those depicted in FIG. 6.

At block 605, a processing system 16 monitors for a request to transfer data from a file 404 including a self-destruction indicator 406. The request can be formatted corresponding to a supported transfer protocol format.

At block 610, the processing system 16 determines a targeted destination of the data based on detecting the request to transfer the data from the file 404 including the self-destruction indicator 406. The targeted destination can be determined based on the type of transfer initiated. For instance, a data transfer can be initiated at the application layer 302 using file transfer protocol (FTP), Telnet, hypertext transfer protocol (HTTP), simple mail transfer protocol (SMTP), or other such known protocols.

At block 615, the processing system 16 determines whether the targeted destination is within an allowed network list 408 associated with the file 404. This may include a lookup operation with a domain name system (DNS) server or other resources that support mapping of domain names to IP addresses to verify a computer system 202 and/or computer network 204A-204N of the targeted destination.

At block 620, the processing system 16 prevents the transfer of data from the file 404 to the targeted destination through a network adapter 20 based on determining that the allowed network list 408 excludes the targeted destination.

The file 404 can be stored in a storage system 206, and preventing the transfer of data from the file 404 to the targeted destination can include deleting the file 404 from the storage system 206.

At least one layer of a communication protocol stack 300 can be configured to perform the monitoring and the preventing of blocks 605-620. The at least one layer of the communication protocol stack 300 can include an application layer 302 operable to deny the transfer of data to another layer of the communication protocol stack 300. The application layer 302 can include a user interface 500 operable to tag the file 404 with the self-destruction indicator 406 and select at least one computer network 204A-204N for the allowed network list 408 associated with the file 404. The at least one layer of the communication protocol stack 300 can include an intermediate protocol layer 303 between the application layer 302 and a transport layer 304, where the intermediate protocol layer 303 is operable to deny the transfer of data to the transport layer 304 by destroying one or more packets including the data. The at least one layer of the communication protocol stack 300 can include the transport layer 304 operable to deny the transfer of data by destroying one or more packets including the data. The communication protocol stack 300 can be configured to split the data into a plurality of data units 410 including a tag indicative of the self-destruction indicator 406 and the allowed network list 408.

In some embodiments, the processing system 16 and the network adapter 20 are components of at least one network device 208. The at least one network device 208 can include a network switch operable to perform the preventing of block 620 by destroying Ethernet frames including the data units 410 and generating a denial feedback message to trigger deletion of the file 404. For example, the application layer 302 can be configured to detect the denial feedback message and delete the file 404 from the storage system 206.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A system comprising:
a network adapter configured to interface with one or more computer networks; and
a processing system coupled to the network adapter and configured to perform a plurality of operations comprising:
monitoring for a request to transfer data from a file including a self-destruction indicator by analyzing one or more layers of a communication protocol stack comprising at least an application layer and a transport layer to communicate with the one or more computer networks;
determining a targeted destination of the data based on detecting the request to transfer the data from the file including the self-destruction indicator in the one or more layers;
accessing an allowed network list associated with the file, wherein the allowed network list defines one or more network locations where the file is allowed to exist;

determining whether the targeted destination is within the allowed network list associated with the file; and preventing a transfer of data from the file to the targeted destination through the network adapter based on determining that the allowed network list excludes the targeted destination, wherein the transfer of data is prevented between the application layer and the transport layer or to a layer below the transport layer in the communication protocol stack for the transfer initiated to the targeted destination.

2. The system of claim 1, further comprising a storage system configured to store the file, wherein preventing the transfer of data from the file to the targeted destination further comprises deleting the file from the storage system.

3. The system of claim 1, wherein the application layer further comprises a user interface configured to apply a tag to the file with the self-destruction indicator and select at least one of the one or more computer networks for the allowed network list associated with the file.

4. The system of claim 3, wherein at least one layer of the communication protocol stack comprises an intermediate protocol layer between the application layer and the transport layer, the intermediate protocol layer configured to deny the transfer of data to the transport layer by destroying one or more packets comprising the data.

5. The system of claim 3, wherein the communication protocol stack is configured to split the data into a plurality of data units comprising the tag as a bit indicative of the self-destruction indicator and the allowed network list, and the processing system and the network adapter are components of at least one network device.

6. The system of claim 5, wherein the at least one network device comprises a network switch configured to perform the preventing by destroying Ethernet frames comprising the data units and generating a denial feedback message to trigger deletion of the file.

7. The system of claim 1, wherein the self-destruction indicator is applied on a folder basis for the file and one or more other files stored within a same folder.

8. The system of claim 1, wherein the application layer is configured to detect a denial feedback message from a network switch that receives the self-destruction indicator, and the application layer is configured to delete the file from the storage system based on the denial feedback message.

9. A method of data transfer prevention, the method comprising:

monitoring, by a processing system, for a request to transfer data from a file including a self-destruction indicator by analyzing one or more layers of a communication protocol stack comprising at least an application layer and a transport layer to communicate with the one or more computer networks;

determining, by the processing system, a targeted destination of the data based on detecting the request to transfer the data from the file including the self-destruction indicator in the one or more layers;

accessing an allowed network list associated with the file, wherein the allowed network list defines one or more network locations where the file is allowed to exist;

determining, by the processing system, whether the targeted destination is within the allowed network list associated with the file; and preventing, by the processing system, the transfer of data from the file to the targeted destination through a network adapter based on determining that the allowed network list excludes the targeted destination, wherein the transfer of data is prevented between the application layer and the transport layer or to a layer below the transport layer in the communication protocol stack for the transfer initiated to the targeted destination.

10. The method of claim 9, wherein the file is stored in a storage system and preventing the transfer of data from the file to the targeted destination further comprises deleting the file from the storage system.

11. The method of claim 9, wherein the application layer further comprises a user interface configured to apply a tag to the file with the self-destruction indicator and select at least one computer network for the allowed network list associated with the file.

12. The method of claim 11, wherein at least one layer of the communication protocol stack comprises an intermediate protocol layer between the application layer and the transport layer, the intermediate protocol layer configured to deny the transfer of data to the transport layer by destroying one or more packets comprising the data.

13. The method of claim 11, wherein the communication protocol stack is configured to split the data into a plurality of data units comprising the tag as a bit indicative of the self-destruction indicator and the allowed network list, and the processing system and the network adapter are components of at least one network device.

14. The method of claim 13, wherein the at least one network device comprises a network switch configured to perform the preventing by destroying Ethernet frames comprising the data units and generating a denial feedback message to trigger deletion of the file.

15. The method of claim 9, wherein the self-destruction indicator is applied on a folder basis for the file and one or more other files stored within a same folder.

16. The method of claim 9, wherein the application layer is configured to detect a denial feedback message from a network switch that receives the self-destruction indicator, and the application layer is configured to delete the file from the storage system based on the denial feedback message.

17. A computer program product comprising a computer readable storage medium having program instructions embodied therewith, the program instructions executable by a processing system to perform operations comprising:

monitoring for a request to transfer data from a file including a self-destruction indicator by analyzing one or more layers of a communication protocol stack comprising at least an application layer and a transport layer to communicate with the one or more computer networks;

determining a targeted destination of the data based on detecting the request to transfer the data from the file including the self-destruction indicator in the one or more layers;

accessing an allowed network list associated with the file, wherein the allowed network list defines one or more network locations where the file is allowed to exist;

determining whether the targeted destination is within the allowed network list associated with the file; and preventing a transfer of data from the file to the targeted destination through a network adapter based on determining that the allowed network list excludes the targeted destination, wherein the transfer of data is prevented between the application layer and the transport layer or to a layer below the transport layer in the communication protocol stack for the transfer initiated to the targeted destination.

18. The computer program product of claim 17, wherein the program instructions executable by the processing system are further configured to perform operations comprising:

providing a user interface configured to apply a tag to the file with the self-destruction indicator and select at least one computer network for the allowed network list associated with the file.

19. The computer program product of claim 18, wherein at least one layer of the communication protocol stack comprises an intermediate protocol layer between the application layer and the transport layer, the intermediate protocol layer configured to deny the transfer of data to the transport layer by destroying one or more packets comprising the data.

20. The computer program product of claim 18, wherein the communication protocol stack is configured to split the data into a plurality of data units comprising the tag as a bit indicative of the self-destruction indicator and the allowed network list, and the processing system and the network adapter are components of at least one network device.

\* \* \* \* \*